United States Patent [19]

Schwarzer, et al.

[11] 3,898,391

[45] Aug. 5, 1975

[54] TWO-STAGE TIME-DIVISION MULTIPLEX TELEPHONE SYSTEM

[75] Inventor: Michael Schwarzer, Frankfurt am Main-Schwanheim; Johannes-Georg Schosnig, Frankfurt am Main, Germany

[73] Assignee: Telefonbau und Normalzeit G.m.b. H., Frankfurt am Main, Germany

[22] Filed: Mar. 7, 1973

[21] Appl. No.: 338,779

[30] Foreign Application Priority Data

Mar. 9, 1972 Germany ................P 22 11 400.7

[52] U.S. Cl...........................179/15 AT; 179/18 J

[51] Int. Cl.........................................H04J 3/00

[58] Field of Search....... 179/15AT, 15A, 15AQ, 179/15BM, 15BA, 18J

[56] References Cited

UNITED STATES PATENTS

| | | | |
|---|---|---|---|
| 3,694,580 | 9/1972 | Inose | 179/15AT |
| 3,597,544 | 3/1971 | Kennedy | 179/2DP |
| 3,492,430 | 1/1970 | Vigliante | 179/15AT |
| 3,401,235 | 9/1968 | Corbin | 179/15AT |
| 3,311,705 | 3/1967 | Corre | 179/15AT |
| 3,280,265 | 10/1966 | Von Sanden | 179/15AT |
| 3,275,749 | 9/1966 | Kunihiro | 179/15AT |
| 2,877,304 | 3/1959 | Hagenhaus | 179/15AT |

*Primary Examiner*—Kathleen H. Claffy
*Assistant Examiner*—Thomas D'Amico
*Attorney, Agent or Firm*—Erwin Salzer

[57] ABSTRACT

An improved two-stage time division multiplex system or telephone exchange adapted for four-wire operation. The line terminals are sub-divided according to their functions into groups, each group having, and being controlled by, its own group connection store. The incoming and outgoing lines of each group are connected to separate buses or highways, and the buses or highways of each group may be interconnected by gates or coupling points. The buses or highways connected to the outgoing lines of all groups may be connected by gates or controllable coupling points to the buses or highways to which the incoming lines are connected. The last mentioned coupling points are under the control of bus connection stores. Both the group connection stores and the bus connection stores are under the control of a central programmed computer having a central or computer store.

1 Claim, 4 Drawing Figures

TWO-STAGE TIME-DIVISION MULTIPLEX TELEPHONE SYSTEM

BACKGROUND OF THE INVENTION

In prior art time-division multiplex telephone systems the number of connections which may be established and maintained simultaneously over one single bus or highway is limited by the electrical properties of the bus or highway, and the switching speed of the connection means to a number in the order of about 100. Since there is often a need for establishing and maintaining a larger number of simultaneous connections, it is necessary to expand time-division multiplex systems in such a way as to cope with high traffic density requirements. As long as multiplexing is effected in but one stage, the number of coupling points must be increased, resulting in systems having a plurality of buses or highways instead of but one. In view of the limitations and drawbacks of such systems it is generally more desirable to resort to multi-stage time-division multiplex systems.

One prior art multistage time-division multiplex system is limited to two-wire operation, and cannot readily be adapted for four-wire operation.

The Highgate Wood experimental electronic telephone exchange system installed in North London, England, lends itself to four-wire operation, and has means for multi-stage time-division multiplexing. In that system the external lines are arranged in groups and all the lines in one group are connected by gates to a pair of group highways or buses, one for each direction of transmission. Each pair of group highways or group buses can be interconnected by an inter-group gate, or inter-group coupling point. In other words, the in-highway and the out-highway of each group can be connected by an inter-group gate, or inter-group coupling point. The invention relates to a greatly improved version of the aforementioned experimental system.

SUMMARY OF THE INVENTION

One concept underlying the present invention is to effect the control of groups of peripheral devices such as groups of subscriber terminals, groups of AL–QL, and NAL lines, and groups of switchboards and data transmission terminals preponderatly by peripheral devices, and to assign only control operations of a higher order to a programmed digital computer in the central exchange.

According to this invention the external lines are arranged in groups depending upon function, i.e. subscriber station groups, special line groups and special groups. Each of these groups is provided with, and operatively related to, a group connection store. A bus connection store is provided for, and operatively related to, each in-bus (or in-highway) or out-bus (or out-highway) of each group. The bus connection store connects the various out-buses and in-buses of the particular groups by means of coupling points with other in-buses and out-buses. The aforementioned group connection stores as well as the aforementioned bus connection stores are controlled over a particular channel system by a central digital computer, or by a corresponding programmable centrally located system.

In telephone systems embodying the present invention the aforementioned functional terminal or line groups form separate units which require but a relatively limited number of lines for their connection to the centrally located coupling stage and the centrally located system control. This is of particular importance in instances of time-division multiplex systems which extend over large areas.

Another desirable feature of systems embodying the present invention resides in the fact that the pulse density in the long buses or highways and in the central coupling stage is but half as large as in the remote spatially concentrated terminal groups.

Still another desirable feature of systems embodying the present invention resides in the fact that the central control computer has but decision making functions all effectuating functions being carried out outside in decentralized equipment.

Systems embodying the present invention are particularly applicable in instances where flexibility is of the essence, and further expansion thereof is contemplated.

DESCRIPTION OF PREFERRED EMBODIMENT

Figure 1:
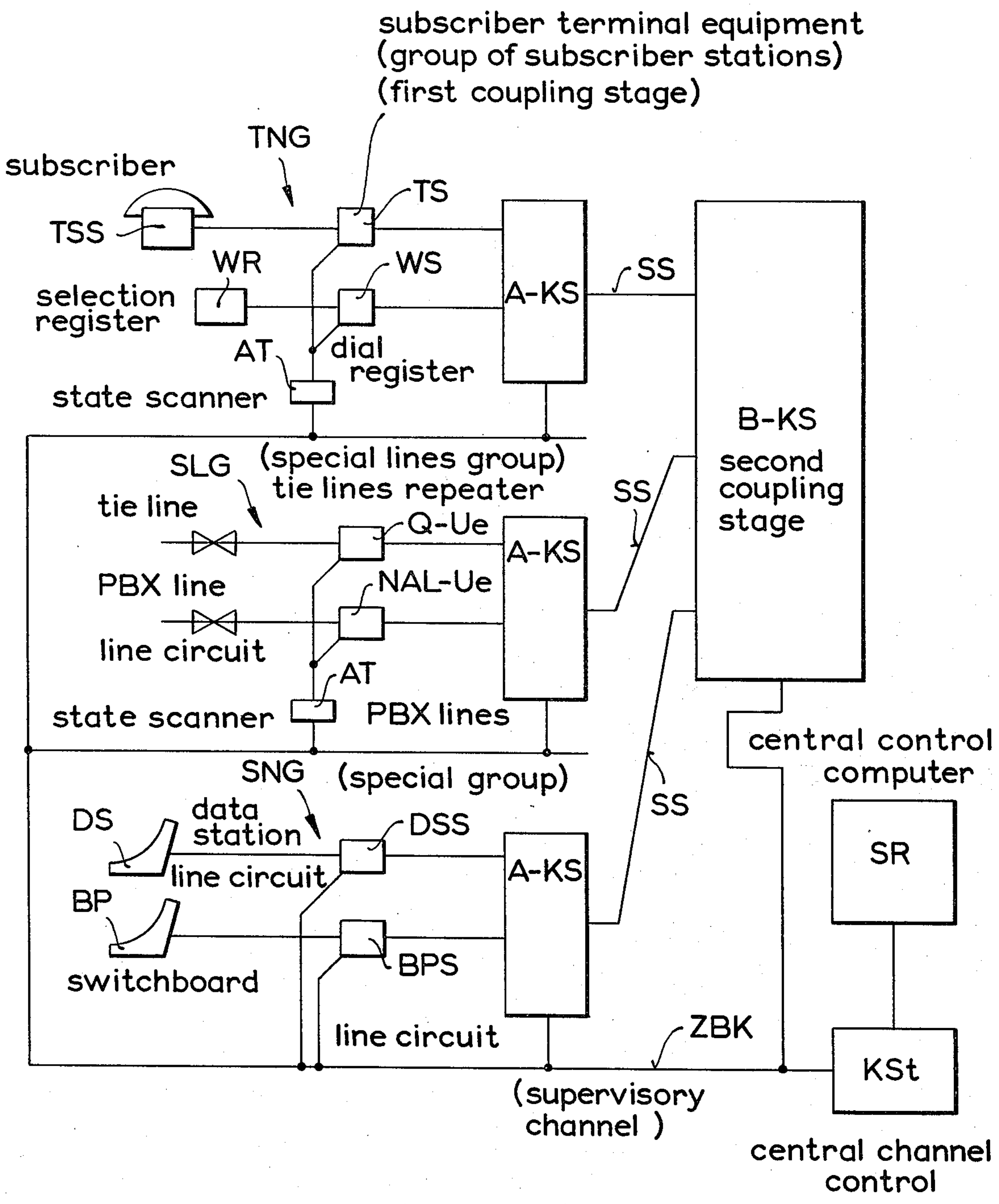
FIG. 1 is a block diagram of a time-division multiplex telephone system including two stages, the block diagram also showing the central exchange of the system.

Referring now to FIG. 1, reference character A–KS has been applied to indicate the first coupling stage and reference character B–KS has been applied to indicate the second coupling stage of a time-multiplex system having two stages. The first coupling stage A–KS includes several groups as, for instance, groups TNG of subscriber stations, special line groups SLG and special groups SNG. FIG. 1 shows by way of example but one of each of the aforementioned groups. The groups TNG of subscriber stations, of which there may be many, depending upon the system under consideration, serve the purpose of connecting subscriber stations TSS by the intermediary of subscriber terminal equipment TS to the coupling stage A–KS. The individual voice channels extend from the subscriber stations TSS to the coupling stage A–KS, but the state of the subscriber stations TSS (e.g. "idle" or "busy") is determined by a state scanner AT and a corresponding signal is transmitted by way of the state and control signal transmission path ZBK and channel control KSt for said path to the centrally located digital control computer SR. The latter transmits control signals by the intermediary of the state and control signal transmission path to the coupling stages A–KS and B–KS. Both coupling stages A–KS and B–KS are interconnected by the voice buses SS, and establish the desired new connections on the basis of the control signals being received by them.

Reference character WR has been applied to indicate a dial register which receives and stores dialed information and transmits the same by the intermediary of the dialed information circuitry WS to the coupling stage A–KS.

In a similar fashion special lines groups SLG are connected to the coupling stage A–KS. The special lines groups SLG include leased tie lines, and extension station or PBX lines NAL-Ue, respectively. Reference character Q-Ue has been applied to indicate a leased tie line repeater for connecting a leased tie line to coupling A–KS. As a general rule, the density of traffic in the lines pertaining to groups SLG is larger and the number of such connections is smaller than those in groups TNG of subscriber stations.

The special groups SNG include switchboards BP and special telecommunication devices as, for instance, conference call devices, data stations DS or picture phone stations which are connected by the intermediary of appropriate intermediary circuitry BPS and DSS to the coupling stage A–KS.

All coupling stages A–KS are alike, except that special groups SNG call for wide band transmission.

Figure 2:
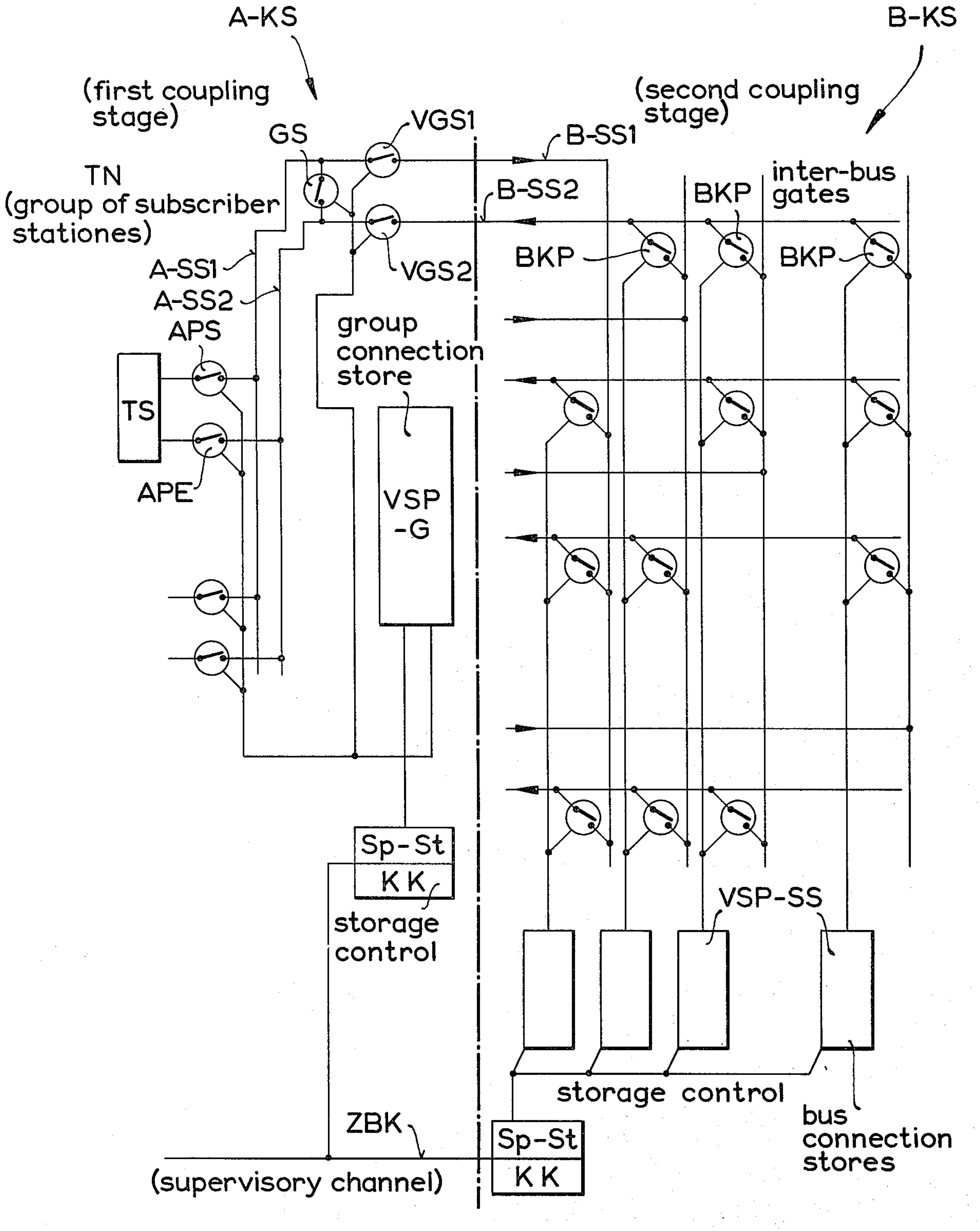
FIG. 2 illustrates diagrammatically the internal structure of the two coupling stages.

Referring now to FIG. 2, coupling stages A–KS and B–KS are shown therein in greater detail. The subscriber station TS is connected by four-wire lines to voice buses A–SS1 and A–SS2 by the intermediary of amplitude sample transmitters APS and amplitude sample receivers APE. There are connections whose origin and termination pertain to the same group. In order to establish such connections voice buses A–SS1 and A–SS2 may be interconnected by the group switching device GS. Establishing connections between different groups of lines involves the coupling stage B–KS. To this end the voice buses A–SS1 and A–SS2 may be interconnected by group connection switching devices VGS1 and VGS2 with corresponding voice buses B–SS1 and B–SS2, respectively. Reference character BKP has been applied to indicate switching devices for connecting the aforementioned buses B–SS1 and B–SS2 of the coupling stage B–KS shown in FIG. 2 with the corresponding buses of coupling stage B–KS of other groups of lines which are not shown in FIG. 2. The coupling stage B–KS shown in FIG. 2 is structured in such a way that the transmitting voice buses of one group—e.g. buses B–SS1 and B–SS2 of a group TNG of subscriber stations—can be connected to the receiving voice buses of all other groups by the intermediary of one of a plurality of switching devices BKP.

The system is a time-division multiplex system with pulse amplitude modulation (PAM). Each transmitting line is scanned or sampled periodically at a minimum scanning rate. The instantaneous value of the amplitude is transmitted within a short time by the intermediary of voice buses and amplitude sample transmitters and stored until the next amplitude sample is received. The periodic switching operation of the time-multiplex coupling points or gates is effected by means of connection storage devices which operate periodically as is well known in the art. The control of the amplitude sample transmitter APS, the control of the amplitude sample receiver APE, the control of the group switching device GS and that of the group connection switching devices VGS1 and VGS2 is effected by means of the storage control system Sp-St and group connection storage device VSP–G. The control of coupling points BKP is effected by bus connection store VSP–SS.

Figure 3:
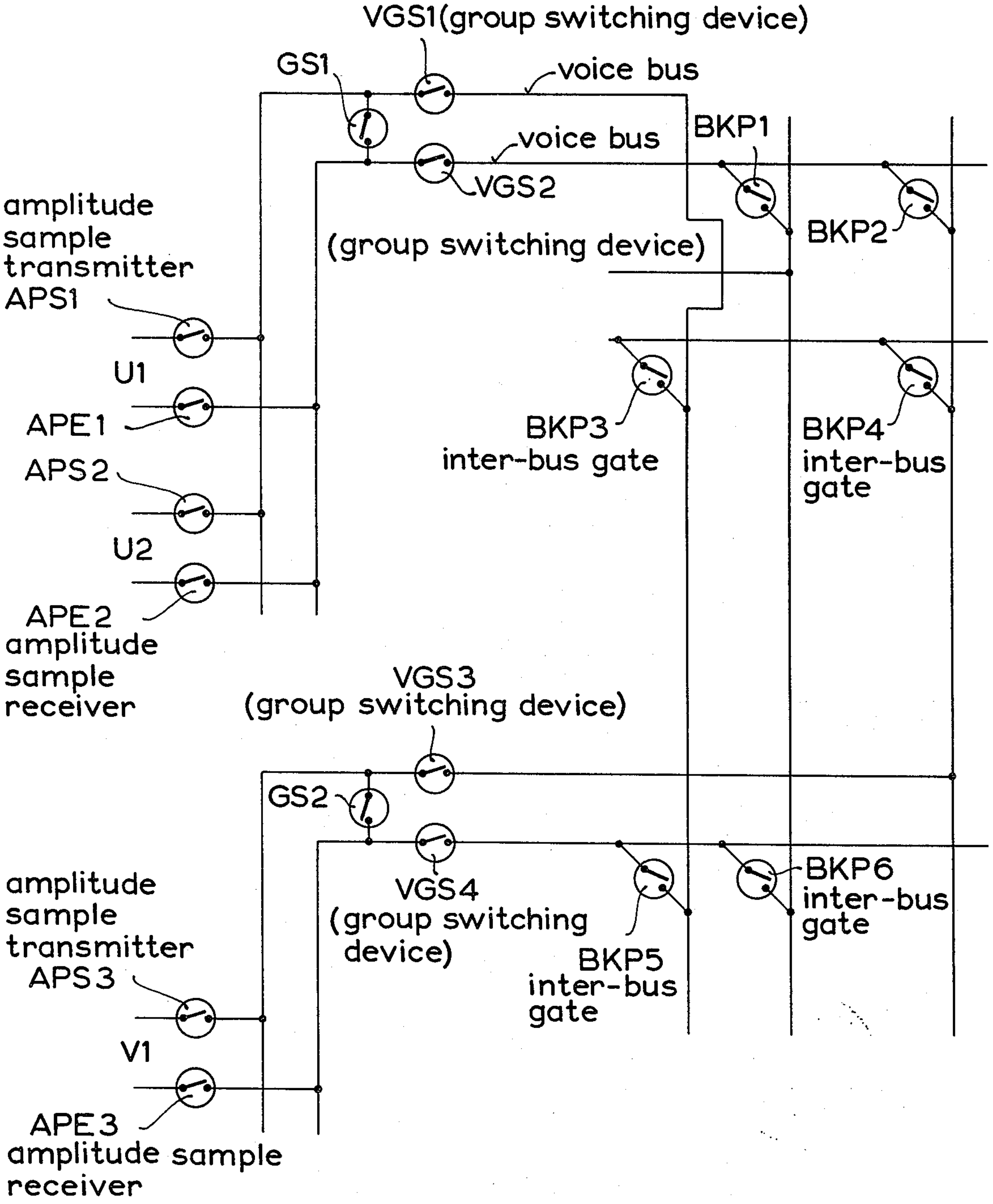
FIG. 3 is a diagram relating to the coupling means.

Referring now to FIG. 3 , it will be explained more in detail in connection with that figure how a connection is established between terminal stations pertaining to the same group and how a connection is established between terminal stations pertaining to different groups. FIG. 3 shows portions of a coupling stage A–KS and of a coupling stage B–KS shown more in detail in FIGS. 1 and 2 and described in connection with these two figures. The system shown is one without change of phase, i.e. a certain fixed phase within a larger interval of time is assigned to a given connection during which phase information is transmitted in either of both directions. Considering connections between the same group, the two signals are transmitted sequentially over the same message path. On the other hand, considering connections between two different groups, in that instance parallel transmission is effected via two different message paths. This will be explained below in more detail.

Assuming that it is intended to interconnect two lines $U_1$ and $U_2$ pertaining to the same group U. The fixed phase or interval of time assigned to this specific connection is subdivided into two parts. During the first part of the aforementioned phase or interval of time information is transmitted from line $U_1$ by the intermediary of amplitude sample transmitter APS1, the group switching device GS1, the amplitude sample receiver APE2 to the line $U_2$. During the second part of the aforementioned phase or interval of time information is transmitted from line $U_2$ by the intermediary of amplitude sample transmitter APS1, the group switching device GS1, and the amplitude sample receiver APE1 to the line $U_1$. It is thus apparent that two amplitude samples are transmitted within one complete phase or interval of time as, for instance, by the intermediary of group switching device GS1.

Considering now the case of establishing a connection between lines $U_1$ and $V_1$ which pertain to different groups. In that instance information is transmitted in another fashion than in the instance which has been considered above. In the case or instance of a connection between lines $U_1$ and $V_1$ pertaining to different groups information is transmitted within the same phase or interval of time from line $U_1$ by the intermediary of amplitude sample transmitter APS1, the group connection switching device VGS1, the coupling point BKP5, the group connection switching device VGS4 and the amplitude sample receiver APE3 to line VI, while information is transmitted from lines $V_1$ by the intermediary of amplitude sample transmitter APS3, the group connection switching device VGS3, the coupling point BKP2, the group connection switching device VGS2 and the amplitude sample receiver APS1 to line $U_1$. It will be apparent from the above that the pulse density along all elements forming the communication channel is only half of the pulse density which prevails when lines are interconnected which pertain to the same group. Since the length of a communication channel established between two different groups is generally longer than the length of an intra-group communication channel, this tends to result in undesirable secondary effects which can be avoided by increasing the spacing between pulses.

Figure 4:
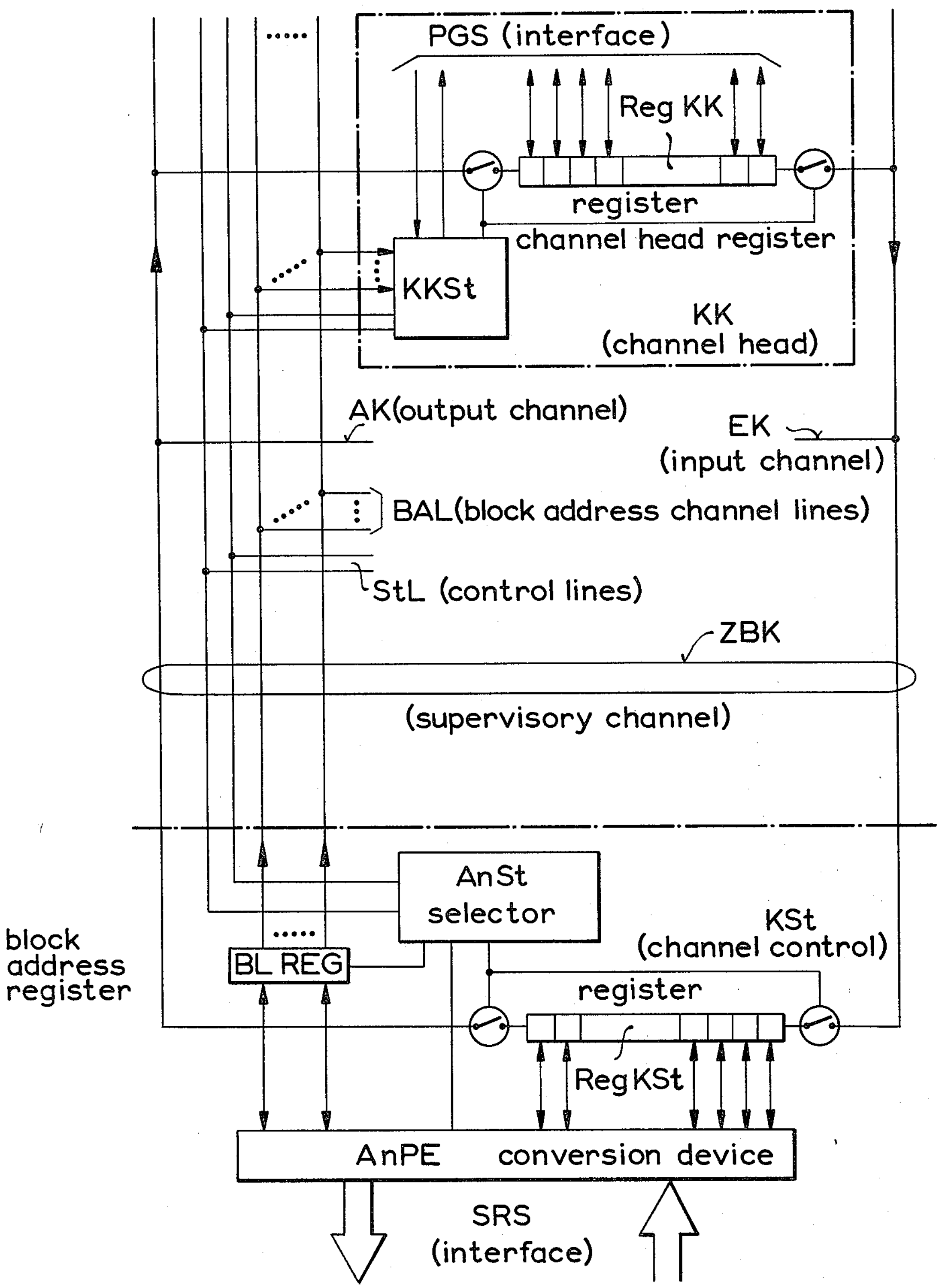
FIG. 4 is a diagrammatic representation of communication channels forming part of the present invention.

As shown in FIG. 1 the coupling stages A–KS and B–KS are connected to the central control computer SR by the intermediary of the state and control channel ZBK and the channel control KSt. The adaptation of the peripheral devices to the aforementioned channel is effected by channel heads KK. This is illustrated in FIG. 4 and will be described below more in detail.

The state and control channel ZBK includes an input channel EK for serially transmitting information regarding states in central direction, an output channel AK for serially transmitting control signals in a direction opposite to said central direction, block address lines BAL for selecting individual channel heads KK and control lines StL for controlling transmission conditions. The channel heads KK and the channel control KSt include registers Reg.KSt and Reg.KK, respectively, for storing signals relating to state and supervisory control. Writing into the aforementioned registers and readout thereof, respectively, is effected in channel heads KK by means of peripheral devices such as, for instance, the group connection storage device VSP–G (FIG. 2), by the intermediary of parallel interface device PGS. On the other hand, the transmission between channel heads KK and the centrally arranged channel control KSt is effected serially. The output process is initiated by the central control computer SR. The output control or supervisory signal is transmitted through interface device SRS to channel control KSt. That signal includes a control or supervisory code signal proper, transmitted by conversion device AnPE to the register Reg. KSt and the address of the channel head intended to be reached. The term conversion device as used in this context is intended to refer to means for modifying in one way or another information transmitted to, or from, the central control computer. Such a conversion may consist in a change of speed, a series to parallel conversion or of a change of coding. The address of the channel head intended to be reached is initially received by block address register BL Reg. and is transmitted from there by block address line BAL to the respective channel head KK. The selector AnSt and the control lines StL initiate the transmission process by which the content of register Reg.KSt is transmitted serially by means of output channel AK to the register Reg.KK of the selected channel head KK. Said content is then transmitted in parallel by way of the interface device PGS to the device to be controlled. The input is effected in a similar fashion. Since the address of the channel head KK which is in a state of readiness is initially not known to the channel control KSt, a scanning process is initiated involving a step-by-step change of the address register BL Reg. until a change of state is noted by input channel EK. Only then is this signal serially transmitted to the channel control KSt and placed into the control computer SR, jointly with the address of the corresponding channel head.

As is apparent from the above the object of the channel system—i.e. the individual channel heads KK, the state signal and the control signal communication channel ZBK and the channel control KSt is to transmit state indicating signals and control or supervisory signals between the periphery of the system and its central unit. This may be further illustrated by the following example.

When an idle subscriber goes off-hook, the scanning device AT of the group of subscriber stations to which the particular subscriber belongs senses the change of state from "idle" to "busy". This change of state signal is combined with a tag signal indicating whether the calling subscriber station is a conventional dialing station, a key dialing station, a data transmitting and receiving station, a picture telephone station, etc., to a unitary message and transmitted to the central unit by way of a channel head KK, a signal channel and channel control KSt. The message is processed in the central control unit. To this end a clear or empty line is seized and reserved in the central call record. Further a search is made for a clear line in the selection register WR. As a result of the operations in the central unit, a supervisory order for the respective group of subscribers is assembled. This supervisory order transmitted to connection storage VSP–G by the channel system includes the number of the connection line in the connection storage VSP–G to be seized, the number of the subscriber station TSS, the number of the selection register WR and a control signal for processing the call. The number of the subscriber station, the number of the selection register and the control signal are recorded in the addressed line of the storage control system Sp–St. In the instant case the above referred-to control signal results in that the transmission end of the subscriber station is periodically connected to the selection register WR, and that its receiving end is supplied with a dialing tone.

The operational task of the central unit is completed when it has assembled the supervisory order. The operational task of the channel control KSt is terminated when it transmits the supervisory order to the channel head KK. The latter is freed or idled when the storage control system Sp–St has received the order. Finally, the operational task of the storage control system Sp–St is completed when a record is placed in the particular storage line of the storage control system. This mode of independent operation of the central unit, the channel control KSt, the the channel heads KK and the peripheral storage control units Sp–St makes it possible to optimize the distribution of the load, and to achieve a reasonable balance among the various speeds of operation.

The central control computer RS may be either a general purpose computer or a special purpose computer with programmed control and central storage or memory.

I claim as my invention:

1. A two stage time-division multiplex telephone system including a. external lines connecting amplitude sample transmitters (ASP) and amplitude sample receivers (APE) with first stage outgoing and incoming buses (A–SS1, A–SS2), said external lines being arranged in equal function groups (TNG, SLG. SNG), and external lines pertaining to the same of said equal function groups being connected to a pair of said first stage outgoing and incoming buses;

b. first coupling points (GS) each for interconnecting pairs of said first stage outgoing and incoming buses (A–SS1, A–SS2) that are connected to one of said equal function groups (TNG, SLG, SNG) and group connection stores (VSP–G) each controlling one of said first coupling points (GS) to establish two wire systems between said external lines pertaining to the same of said equal function groups;

c. pairs of second stage outgoing and incoming buses (B–SS1, B–SS2);

d. pairs of group switching devices (VGS1), VGS2), each pair of said pairs of group switching devices being interposed between a pair of said first stage outgoing and incoming buses (A–SS1, A–SS2), and a pair of said second stage outgoing and incoming buses (B–SS1, B–SS2), and said pairs of group switching devices (VGS1, VGS2) being under the control of said group connection stores (VSP–G);

e. a plurality of pairs of second coupling points (BKP1, BKP2, BKP3, . . .), each of said plurality of pairs of second coupling points being arranged to interconnect a pair of said second stage outgoing and incoming buses (B–SS1, B–SS2) and being under the control of one of a plurality of bus connection stores (VSP–SS) to establish four wire connections between pairs of said external lines of different of said equal function groups (TNG, SLG, SNG); and f. a channel system transmitting control data connecting said group connection stores (VSP–G) and said bus connection stores (VSP–SS) to a central programmed control computer (SR).

* * * * *